Figure 3:
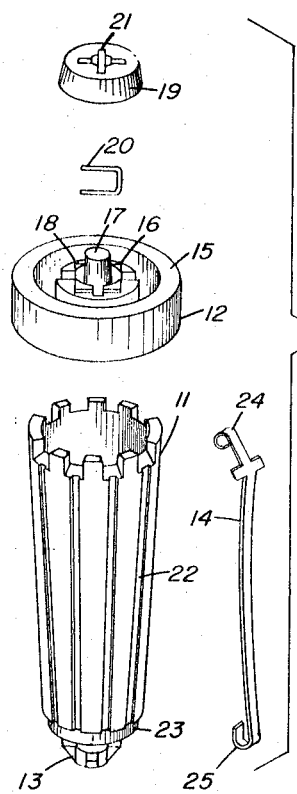

Oct. 17, 1967 L. M. WOOD 3,348,188
FLASH EXTENDER
Filed June 28, 1965

LAWRENCE M. WOOD
INVENTOR.

BY
ATTORNEYS

United States Patent Office 3,348,188
Patented Oct. 17, 1967

3,348,188
FLASH EXTENDER
Lawrence M. Wood, Rochester, N.Y., assignor to Eastman Kodak Company, Rochester, N.Y., a corporation of New Jersey
Filed June 28, 1965, Ser. No. 467,278
2 Claims. (Cl. 339—32)

This invention relates to flash photography, and more particularly, to multilamp photoflash packages and photographic still cameras having built-in flash systems for use therewith.

Fore some time, there have been produced a number of photographic cameras having built-in photoflash units. Normally these units include a lamp receiving socket, a built-in reflector and suitable electrical circuitry to synchronize flash with camera operation. More recently, there have been developed photographic cameras including units to receive and index disposable multilamp photoflash packages as disclosed, for example, in U.S. application Ser. No. 417,913, Franklin D. Kottler et al., filed Dec. 14, 1964.

In any case, there exists a trend toward the reduction in size of photographic cameras and flash units to enable ease of handling, storage, etc. However, reduction in size has led to a reduced distance between the physical positions of the camera axis and the flash lamp receiving socket. In many instances it is desirable to position a flash lamp at a certain distance from the camera axis, to produce limited shadows, created by the flash, which will provide highlight and an effect of depth without excess contrast. In the case of color film, the use of augmenting flash at a minimum angle of incidence when photographing human subjects may create a condition known as "red-eye," in which red light from the flash lamp is reflected by the retinas of the subject's eyes onto the photographic film to show the pupils as red on the developed color print.

In order to provide for limited shadows and to reduce the effect of "red-eye," I have provided a flash extender, suitable particularly for use with cameras having built-in flash arrangements, by which the distance between the flash lamp and the camera axis is extended a predetermined amount to increase the angle of incidence. More specifically, my invention comprises a flash extender which is suitable for use with cameras with built-in flash units using multilamp flash packages as disclosed, for example, in U.S. application Ser. No. 417,913. In one embodiment of my invention, the extender comprises a base portion insertable into the package receiving socket of a photographic camera, an extender column, and a socket portion to receive a multilamp photo-flash package. There is also provided a plurality of electrical contact strips which are engageable at the camera socket terminals of the flash circuit to extend the flash circuit to the socket portion of my extender.

An important object of the invention resides, therefore, in the provision of a flash extender to increase the distance between a flash lamp for augmenting flash and the photographic objective or optical axis of a camera having a built-in flash unit.

A further object of the invention resides in the provision of a flash extender usable with cameras having multilamp package receiving sockets and suitable multilamp photoflash packages.

Yet another object of the present invention resides in the provision of a flash extender which is compact, simple and inexpensive.

Figure 1:
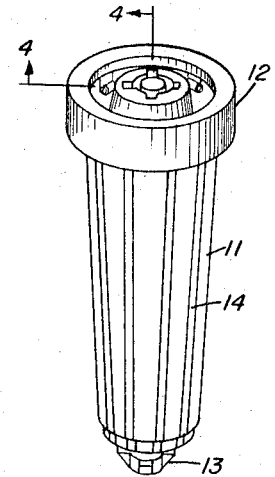
Figure 2:
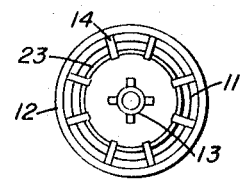
Figure 4:
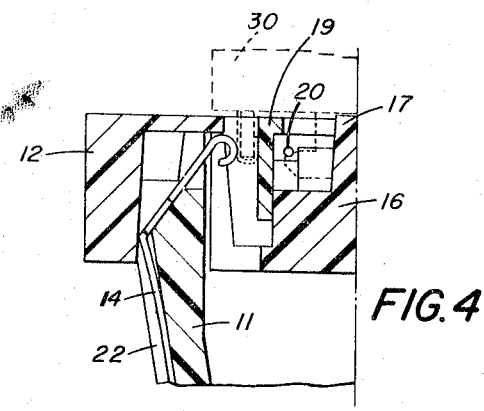

These other objects and advantages will become more apparent during the course of the following description of a preferred embodiment of my invention, the accompanying drawing forming a part thereof and wherein:

FIG. 1 is a perspective view of a preferred embodiment of a flash extender according to my invention;
FIG. 2 is a bottom view of the flash extender shown in FIG. 1;
FIG. 3 is an exploded view showing the various parts of the flash extender; and
FIG. 4 is a partially broken, cross sectional view taken on line 4—4 of FIG. 1.

Referring to FIGS. 1 and 2, a flash extender according to my invention suitably includes a vertical extender column 11, a multilamp flash package receiving socket portion 12, a base portion 13, and a plurality of electrical contact strips extending from the base portion 13 to the socket portion 12.

The receiving socket portion 12 comprises an annular socket housing 15 having a centrally located platform support 16 and an integral central stabilizing post 17. The support 16 and post 17 are connected to the annular portion of the housing 15 by suitable connecting spokes to form a spider. The upper surface of support 16 surrounding post 17 defines a rectangular boss 18 around the edges of which is positioned a resilient U-shaped retaining spring 20.

The legs of spring 20 are biased inwardly and expand outwardly to receive a package. Overlying the support 16 and fixed thereto by sealing or the like is a cover cap 19 defining a central axis opening 21 shaped to receive the connecting post of a suitable multilamp flash package, as disclosed for example in application Ser. No. 417,913.

The extender column 11 defines a plurality (eight) of grooves 22 extending from wider notches at the top end of the column 11 to an annular contact ring 23 at the bottom end of the extender column 11. Positioned in each groove 22 is a contact strip 14 of electrically conductive material. Each strip 14 includes a curved contact terminal 24 at the upper end and a lower end 25 shaped in the form of a clip which overlies the contact ring 23. Retainer tabs adjacent terminal 24 of each strip 14 are fixed within the respective column notch at the upper end of the corresponding groove 22. The base portion 13 defines a depending center post 26 of tubular shape and a plurality (4) of retaining lugs in a manner identical to the post and retaining lugs of a suitable multilamp package as described, thereby enabling the extender base portion 13 to be attached to the multilamp package receiving socket of a photographic still camera. A suitable camera is shown, for example, in U.S. application Ser. No. 458,016, David E. Beach, filed May 24, 1965.

Referring to FIG. 4, the cover portion 15 defines an annular recess receiving the upper end of column 11, with the inner walls of the recess defining openings for passage of the strip end terminals 24 into the central open position of the cover 15 adjacent cap 19. The annular cover 15 and cap 19 together define an intermediate annular opening which receives the electrical contact ring of a multilamp flash package 30, with each strip end terminal 24 physically engaging a respective lead-in wire on the contact ring. The access opening 21 is shaped as shown to permit selective insertion of the center post of the flash package base onto the stabilizing post 17 in any one of four positions with the retaining spring 20 engaging a pair of opposing retaining lugs on the package base to releasably hold the package 30 on the socket portion 12.

In the embodiment shown, the socket portion 12 of my flash extender receives a multilamp package 30 in a fixed position relative thereto with each of the lamp package lead-in wires engaging a contact strip 14, and both the extender and package, when inserted into a camera receiving socket, are rotated to sequentially place the flash lamps of the package 30 in the photoflash circuit of the camera.

I have discovered that a suitable overall vertical dimension for the extender, excluding the center post 26 and ring 23, is approximately two and one-half inches, thereby providing a lamp-to-camera axis distance of three to five inches.

By this dimension, limited shadows from the emitted light of the flash may be provided without extensive contrast, and "red-eye" is substantially eliminated.

The column 11, cover 15 and cap 19 of the embodiment of my invention shown may be manufactured in three molded parts of a suitable non-conductive material such as a thermoplastic, and the eight contact strips 14 may be of a suitable electrically conductive material. An attractive appearance may be provided through contrast by molding the plastic parts in black and using silvered metal strips 14 vertically arranged on the exterior of the column 11 as shown.

While the invention has been described in relation to the preferred embodiment as shown, it is, of course, obvious that certain modifications and variations can be resorted to without departing from the spirit of my invention or the scope of the following claims.

I claim:

1. For use with a multilamp flash package, including a plurality of flash lamps with individual reflectors and a connecting base with a pair of depending lead-in wires from each lamp, together with a camera having socket means to receive such package for sequentially placing said lamps in a photoflash synchronizing circuit: the improvement of a flash extender comprising a retaining base portion identical to the package connecting base and insertable into t he camera socket means; a receiving socket portion defining an annular groove and a central access opening for receiving and detachably retaining the connecting base of an inserted package, with the depending lead-in wires from the lamps positioned in the annular groove; an elongate vertical extender column connecting the base portion and socket portion to separate the package from the camera socket means by a predetermined distance; and a plurality of electrically conductive contact strips, each contact strip extending vertically from the base portion to the socket portion, with an end of the contact strip positioned within the annular groove for engagement with a selected one of the lead-in wires of an inserted lamp, and the other end of the contact strip positioned at the base portion for selective engagement with an electrical terminal of the camera socket means for flashing the corresponding lamp in timed relation with camera operation.

2. The flash extender according to claim 1 wherein the receiving socket portion includes means to retain a received package in a fixed position relative thereto.

References Cited

UNITED STATES PATENTS

| | | | |
|---|---|---|---|
| 2,113,328 | 4/1938 | Makenny | 319—186 |
| 2,448,452 | 8/1948 | Morelock | 339—156 |
| 2,528,121 | 10/1950 | Dickinson | 339—154 X |
| 2,687,028 | 9/1954 | Stein | 339—45 X |
| 2,738,483 | 3/1956 | McLean et al. | 339—156 X |
| 3,244,087 | 4/1966 | Anderson et al. | 240—1.3 X |

FOREIGN PATENTS 903,852  8/1962  Great Britain.

MARVIN A. CHAMPION, *Primary Examiner.*

W. D. MILLER, J. R. MOSES, *Examiners.*